(12) United States Patent
Kuo et al.

(10) Patent No.: US 7,587,651 B2
(45) Date of Patent: Sep. 8, 2009

(54) METHOD AND RELATED APPARATUS FOR CALIBRATING SIGNAL DRIVING PARAMETERS BETWEEN CHIPS

(75) Inventors: Hung-Yi Kuo, Taipei Hsien (TW); Jenny Chen, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 904 days.

(21) Appl. No.: 11/161,614

(22) Filed: Aug. 10, 2005

(65) Prior Publication Data
US 2006/0237705 A1  Oct. 26, 2006

(30) Foreign Application Priority Data
Apr. 25, 2005  (TW) ............................ 94113120 A (51) Int. Cl.
*G01R 31/30* (2006.01)
*G06F 11/00* (2006.01)

(52) U.S. Cl. .................. 714/745; 714/735; 714/738
(58) Field of Classification Search ................. None
See application file for complete search history.

(56) References Cited

U.S. PATENT DOCUMENTS

| 4,843,608 A | * | 6/1989 | Fu et al. ................... 714/820 |
| 4,907,231 A | * | 3/1990 | Watanabe et al. .......... 714/735 |
| 4,949,033 A | * | 8/1990 | Kono et al. ................ 714/733 |

* cited by examiner

*Primary Examiner*—Christine T Tu
(74) *Attorney, Agent, or Firm*—Winston Hsu (57) ABSTRACT

A calibrating method for adjusting related parameters when a first chip and a second chip switch signals is disclosed. The calibrating method includes: utilizing the first chip to output a test signal through using a first driving force in order to represent a test value; utilizing the second chip to receive the test signal and utilizing the second chip to read the test signal to determine a value; and performing a comparison step for comparing the value with the test value to detect whether said value complies with the test value.

15 Claims, 7 Drawing Sheets

METHOD AND RELATED APPARATUS FOR CALIBRATING SIGNAL DRIVING PARAMETERS BETWEEN CHIPS

BACKGROUND OF THE INVENTION

1. Field of the Invention

The invention relates to a calibrating method for adjusting signal driving parameters between chips and a related apparatus thereof, and more particularly, to a calibrating method for performing signal tests between chips to test a better driving force and a related apparatus thereof.

2. Description of the Prior Art

Electronic systems such as microprocessor systems have become highly important hardware foundations in our modern information society. A complicated electronic system utilizes many chips having different functions that co-operate with each other to achieve the complete function of the system. For example, a personal computer system comprises a CPU, chipsets (e.g. the south bridge/north bridge chipset or a chipset integrating the south bridge and north bridge), and a memory module. The chips are utilized to control data exchange between a peripheral device and the chipset. For example, a hard disk drive or an optical disc drive comprises a control chip to manage the data exchange. In addition, a graphic card, network card, and sound card can be regarded as sub-microprocessor systems, wherein each sub-microprocessor system utilizes one or more specific chips to achieve its function. Therefore, how to make all chips of the electronic system co-ordinate with each other in order to achieve the complete function of the electronic device is a key consideration of the design.

As known by those skilled in the art, each chip of the electronic device is installed in a circuit board (such as a printable circuit board, or the motherboard), and the chips are electronically connected to each other through the wires/traces of the circuit board. Considering the circuit characteristic, when a certain chip A has to transfer a signal to chip B, the signal outputting end of the chip A can be regarded as a power source (such as a current source) and the signal receiving end of the chip B can be regarded as a loading (such as a capacitor loading). Therefore, an electronic driving force (e.g. voltage or current) provided by the signal outputting end of chip A is injected through the wires of the circuit board into the signal receiving end of chip B such that the electronic levels (for example, the voltage level or the current level) can be driven appropriately. Chip B can read a value (content) of the signal according to the electronic level of the signal receiving end. The signal transferring operation is therefore completed. For example, in a normal digital electronic system, if the electronic level of the signal receiving end of chip B is higher than a certain predetermined reference value Vrp, chip B can determine it to be a digital signal "1". On the other hand, if the electronic level is lower than a certain reference value Vrn, the chip B can determine it to be a digital signal "0". Therefore, when chip A has to transfer a digital signal "1" to chip B, the driving force provided by chip A (here, the driving force can be called a positive driving force) should be enough to pull up the electronic level of chip B to the reference value Vrp such that chip B is able to determine the signal content of chip A correctly. If chip A has to output a digital signal "0" to chip B, the signal driving force provided by chip A (it can be called a negative driving force) should pull down the electronic level of chip B to the reference value Vrn such that chip B is able to correctly determine the signal content of chip A.

In the prior art, generally speaking, when a chip designer designs a chip, related parameters for signal receiving/transferring operations are embedded inside the chip. In other words, the driving force, which is utilized for transmitting signals, and the reference values for reading the signal contents are installed in the chip. Therefore, if the chips are operated correctly, the chips can receive/transfer signals according to the driving forces and the reference values such that data can be exchanged between the chips. For example, when a computer system is turned on, each chip of the computer system exchanges data according to the driving force/reference value in order to perform an initialization. Then the basic input/output system (BIOS) can be loaded, and the power-on self-test (POST) can be performed such that the booting procedure is completely performed.

When actually implementing an electronic system, however, many non-ideal factors influence the data exchange between chips. This makes the electronic driving force incorrectly drive the electronic level of another chip. For example, manufacturing inaccuracies in the chips may give rise to an insufficient signal driving force of the chip, or cause large impedance at the signal receiving end of a chip such that the electronic level is not easy to pull up or down. Furthermore, the impedance of the wire/trace may be too large (for example, the wire/trace may be too long, or the wire/trace distributed in different conducting layers), or the chip may be operated at a higher or lower temperature than desired. These factors may cause the driving forces/reference values migrations, resulting in the driving forces and the reference values not complying with the original design standards. Even if the chip utilizes the predetermined driving force to output signals, the predetermined electronic level may not be established in the receiving end of another chip. This results in the chip having problems reading the data transferred from the chip that transfers the signals. When this situation occurs in the computer system, the computer system may not correctly perform a booting procedure because each chip cannot smoothly exchange data and therefore the Basic Input Output System (BIOS) cannot correctly be loaded. In other words, the operational environment between the chips (e.g. the wires/traces of the circuit board, and the temperature) dynamically changes, and such variations may be too large to comply with the original designs. In the prior art, a fixed driving force and reference value is set in order to support the data exchange between the chips. Therefore, the prior art cannot sufficiently support the working environment when the chips operate.

SUMMARY OF THE INVENTION

The claimed invention provides a method for calibrating related signal driving parameters (that is, the driving force/reference value) according to the actual data exchange between chips, and a related apparatus thereof. This means the chips coupled to each other can dynamically support the environment in which the operations take place, because the chips are adjusted to correctly utilize calibrated driving forces/reference values when the chips are initially utilized, such that the above-mentioned problem can be solved.

In an embodiment of the present invention, before two chips A and B, which are coupled to each other, can co-operate with each other, chip A and chip B first perform a cross-test of driving force. That is, a chip (e.g. chip A) is utilized as a master, and the other chip (chip B) is utilized as a slave. The master chip starts to output different test signals by using different driving forces in order to represent a same test value. After the slave chip receives the test signal, the slave chip can read the signals one by one and respond by sending a value to the master chip. This allows the master chip to compare the value with the test value and to determine which driving force is better.

For example, assume that the master chip can orderly utilize M different positive driving forces Ip(1) to Ip(M) to pull up the signal receiving end of the slave chip such that the electronic level of said signal receiving end is raised. When implementing the above-mentioned operation, the master chip can orderly utilize the M driving forces to output a digital signal having a test value "1". Some driving forces of the master chip cannot correctly pull up the electronic level to the wanted electronic level. Therefore, the slave chip determines the value corresponding to these unavailable driving forces as 0 instead of the correct value 1. This means the slave chip will transfer back the value 0 to the master chip (please note that the slave chip can utilize a strongest negative driving force to output the value 0 to the master chip such that the master chip does not determine the value 0 incorrectly). After the master chip receives the value 0 from the slave chip, because the value is 0 instead of the correct value 1, the master chip can know that some of the driving forces cannot be utilized for the slave chip to determine the correct value. Similarly, if the slave chip transfers back the correct value, this means that the master chip can utilize the corresponding driving force to send signals. Therefore, by performing the above-mentioned tests between chips, the master chip can detect which driving force can be utilized for the slave chip to read correctly. In another embodiment, the master chip outputs a second test signal corresponding to the test value utilizing a second driving force being different than the first driving force when the response value from the slave chip does not comply with the test value that was previously transmitted by the master chip. Then, chip A and chip B can switch their relationships (that is, chip B becomes the master chip, and chip A becomes the slave chip), and the above-mentioned test can be performed again. After all the tests have been performed, when chip A and chip B operate and exchange data with each other, the correct driving force can be utilized such that chip A and chip B can understand the signals from each other.

According to similar theories, in another embodiment of the present invention, two chips connected to each other can be the master/slave chips for adjusting the reference value of the read signal. The master chip can utilize a better driving force to generate the test signal, and the slave chip can orderly utilize different reference values to read the test signal. Therefore, it can be known which reference value can be correctly utilized to read the signal from the master chip.

In the prior art, each chip switches data/signals with other chips according to predetermined driving forces/reference values. However, the environment the chips operate in (including the impedances of the circuit board, temperatures, and the operations of another chip) can often cause some problems when the chip operates. Therefore, if each chip can only utilize the embedded predetermined driving forces/reference values to output or read signals, the chip cannot dynamically support different environments. In contrast to the prior art, the present invention performs tests before the chips operate and exchange data/signals such that the acceptable driving forces/reference values can be detected first. Therefore, the chip can be ensured to dynamically support all kinds of operational environments. In other words, the present invention chips can correctly exchange signals/data in different operational environments.

The present invention may be utilized in a laptop. Because the space demand of the laptop is strict, the system designer of the laptop may need to place chips in a special arrangement. For example, the signal wire of a particular chip may need to cross different layers of the circuit board or other devices such that the particular chip can be connected to another chip. Furthermore, laptops are often utilized in different environments (both outdoors and indoors). Due to the above-mentioned factors, each chip of the laptop often needs to operate in a difficult environment. Therefore, when the present invention is implemented in the laptop, tests between chips can be performed before the laptop is booted. This can ensure that each chip of the laptop can correctly exchange signals/data such that the whole function of the laptop can be smoothly achieved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
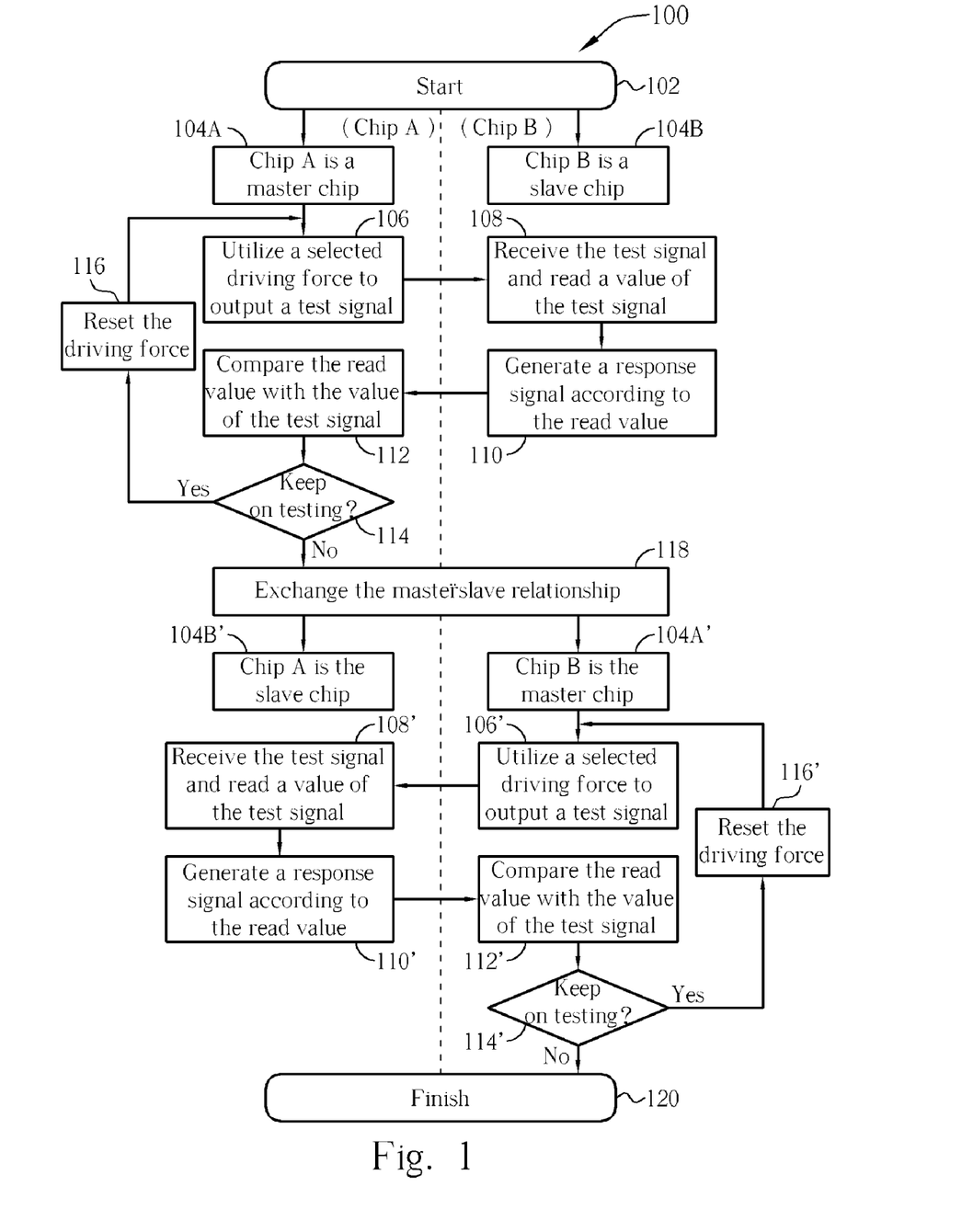
FIG. 1 is a flowchart of calibration technique of an embodiment according to the present invention.

Please refer to FIG. 1, which is a flowchart 100 of the calibration technique of an embodiment according to the present invention. In an electronic system, two connected chips A and B can detect acceptable signal driving forces through using the flowchart 100 in order to ensure that signals generated from each chip can be correctly read by another chip. The flowchart 100 is illustrated as follows:

Step 102: Start. The flowchart 100 can start when the chip has sufficient power supply. For example, if the flowchart 100 is implemented in a computer system, when the computer system is supplied with an external power, the flowchart 100 can start. After completely performing the flowchart 100, each chip can correctly exchange data, and the BIOS of the computer system can be loaded such that the booting procedure can be continuously performed.

Step 104A-step 104B: When the flowchart 100 is performed on two chips A and B connected to each other, chip A can first be the master chip, and chip B can be the slave chip.

Step 106: The master chip utilizes a selected driving force to output a test signal to the slave chip. The content of the test signal is a test value. For example, assume that the master chip can select M different positive driving forces to generate signals to raise the electronic level of the signal receiving end of the slave chip. Therefore, in this step, the master chip can first select one positive driving force from M positive driving forces to output a test signal having a test value "1".

Step 108: The slave chip receives the test signal from the master chip and reads the content of the test signal. As mentioned previously, due to environmental factors or other factors, the test signal from the master chip may not be read correctly by the slave chip. For example, the master chip utilizes a certain positive driving force to output a test signal having a value "1", but the positive driving force cannot sufficiently raise the electronic level of the signal receiving end of the slave chip. The slave chip will therefore determine the content of the test signal to be "0", On the other hand, if the positive driving force of the test signal of the master chip is strong enough to sufficiently raise the electronic level of the signal receiving end of the slave chip, the test signal can successfully be determined as the value "1".

Step 110: The slave chip outputs a response signal back to the master chip according to the value read in step 108. In this step, the slave chip can utilize the strongest driving force to generate the response signal such that the master chip can correctly receive the value read by the slave chip. For example, assume that the slave chip can select K different positive driving forces in order to raise the electronic level of the signal receiving end of the master chip. When step 110 is being performed, the slave chip can select the strongest positive driving force (that is, a largest driving force to raise the electronic level the most) to output a response signal having the value "1". Similarly, if the slave chip can utilize K negative driving forces to pull down the electronic level of the signal receiving end of the master chip, the slave chip can select the strongest negative driving force (that is the driving force which can pull down the electronic level the most) to output a response signal having the value "0".

Step 112: The master chip receives the response signal from the slave chip. Therefore, the master chip can know the value determined by the slave chip from the test signal. The master chip then compare the test value of the test signal with the read value of the slave chip in order to detect whether the value complies with the test value. Here, if the value does not comply with the test value, this represents that the corresponding driving force in step 106 is not enough to generate a correct signal (please note that the correct signal should be correctly read by the slave chip). Therefore, when the master chip or the slave chip finishes the test flowchart 100 and starts to exchange signals with the other, the master chip can prevent the utilization of this incorrect driving force to output signals. For example, the master chip may utilize a particular positive driving force to raise the electronic level of the signal receiving end of the master chip in order to output a test signal having a value "1", but the slave chip reads the test signal as the value "0". This represents that the particular positive driving force is not enough to support the operational environment of the two chips, and the master chip can record the certain positive driving force as an unacceptable (incorrect) driving force. Such incorrect driving forces will not be utilized to output signals. Similarly, the master chip may utilize a particular negative driving force to pull down the electronic level of the signal receiving end of the slave chip in order to output a test signal having a test value "0", but the slave chip reads the test value as the value "1". In this way the master chip can also prevent the utilization of the particular negative driving force to generate signals. If the read value of the slave chip complies with the test value of the test signal, this represents that the driving force of the test signal has sufficient power to pull up or pull down the electronic level. Therefore, the master chip can record the driving force as an acceptable driving force.

When this step is being performed, the master chip can compare the test value with the value read by the slave chip in order to detect whether the value complies with the test value. This procedure can evaluate whether a certain driving force is an acceptable driving force or not. Furthermore, the master chip can store the evaluating results of each driving force such that chips can utilize acceptable driving forces to generate signals when the flowchart 100 is performed completely.

Step 114: The master chip performs the steps 106, 108, 110, and 112 in order to detect whether another driving force is an acceptable driving force. In this step, if another driving force needs to be tested, the master chip can go to step 116. If there is no driving force to be tested, step 118 can be performed.

Step 116: The master chip selects another driving force, and performs the steps 106, 108, 110, and 112 to evaluate whether the driving force is acceptable. Furthermore, the master chip can also select the same driving force to repeat the steps 106, 108, 110, and 112 in order to confirm the driving force again.

Step 118: Chip A and chip B exchange their respective relationships. In the steps 104A and step 104B, chip A is the master chip, and chip B is the slave chip. Chip A can co-ordinate with chip B to evaluate each driving force of chip A. In step 118, chip A and chip B can change the protocol to communicate with each other through the use of predetermined signals. Therefore, chips A and B can exchange their respective relationships (that is, chip B becomes the master chip, and chip A becomes the slave chip) such that each driving force of chip B can be evaluated.

Steps 104A' and 104B': After step 118 is completed, chip B becomes the master chip, and chip A becomes the slave chip for the test.

Steps 106', 108', 110', 112', 114', and 116': Each step is similar to respective steps 106, 108, 110, 112, 114, and 116. The master chip (now chip B) can compare the value read by the slave chip with the test signal in order to evaluate whether a driving force of generating the test signal is acceptable (that is, to detect whether the driving force can generate a correct signal for the slave chip to read).

Step 120: The flowchart 100 is finished. When the driving forces of chip A and chip B are tested, the flowchart 100 can be finished. Chips A and B can then select an acceptable driving force from the driving forces for the data exchange according to evaluated results of the driving forces. For example, if the flowchart 100 is implemented in each chip of a computer system, after the computer system is turned on, every two chips can co-ordinate with each other to perform the flowchart 100 such that each chip can evaluate its driving forces. After finishing the flowchart 100, each chip can exchange data/signals through using an acceptable driving force. Therefore, chips can correctly communicate with each other and start to operate. The BIOS of the computer system can then be executed such that the booting procedure can be completely performed. At this point, the computer system is booted completely and the user can start to use the computer system.

Figure 2:
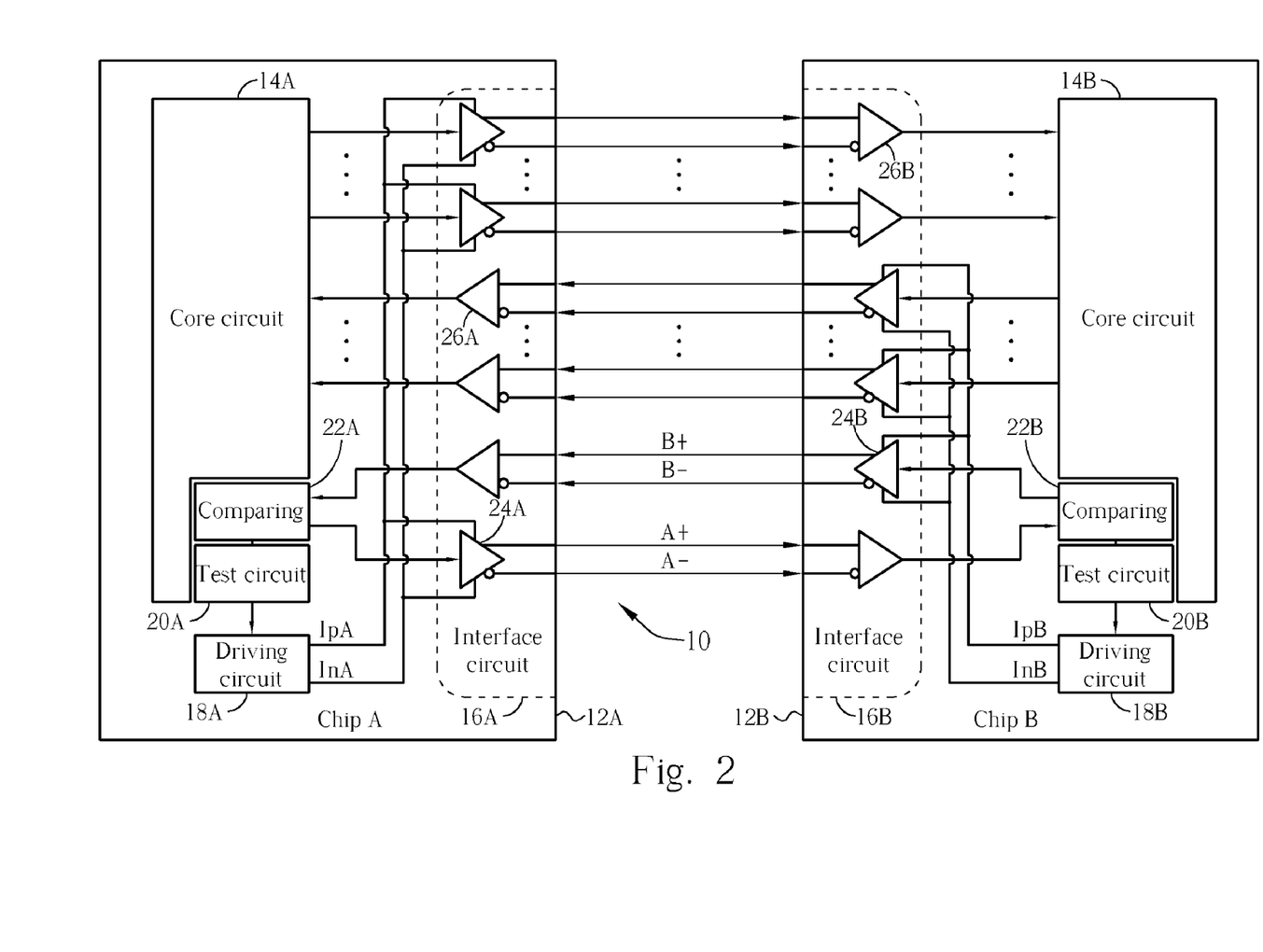
FIG. 2 is a block diagram of an electronic system according to the present invention.
Figure 3:
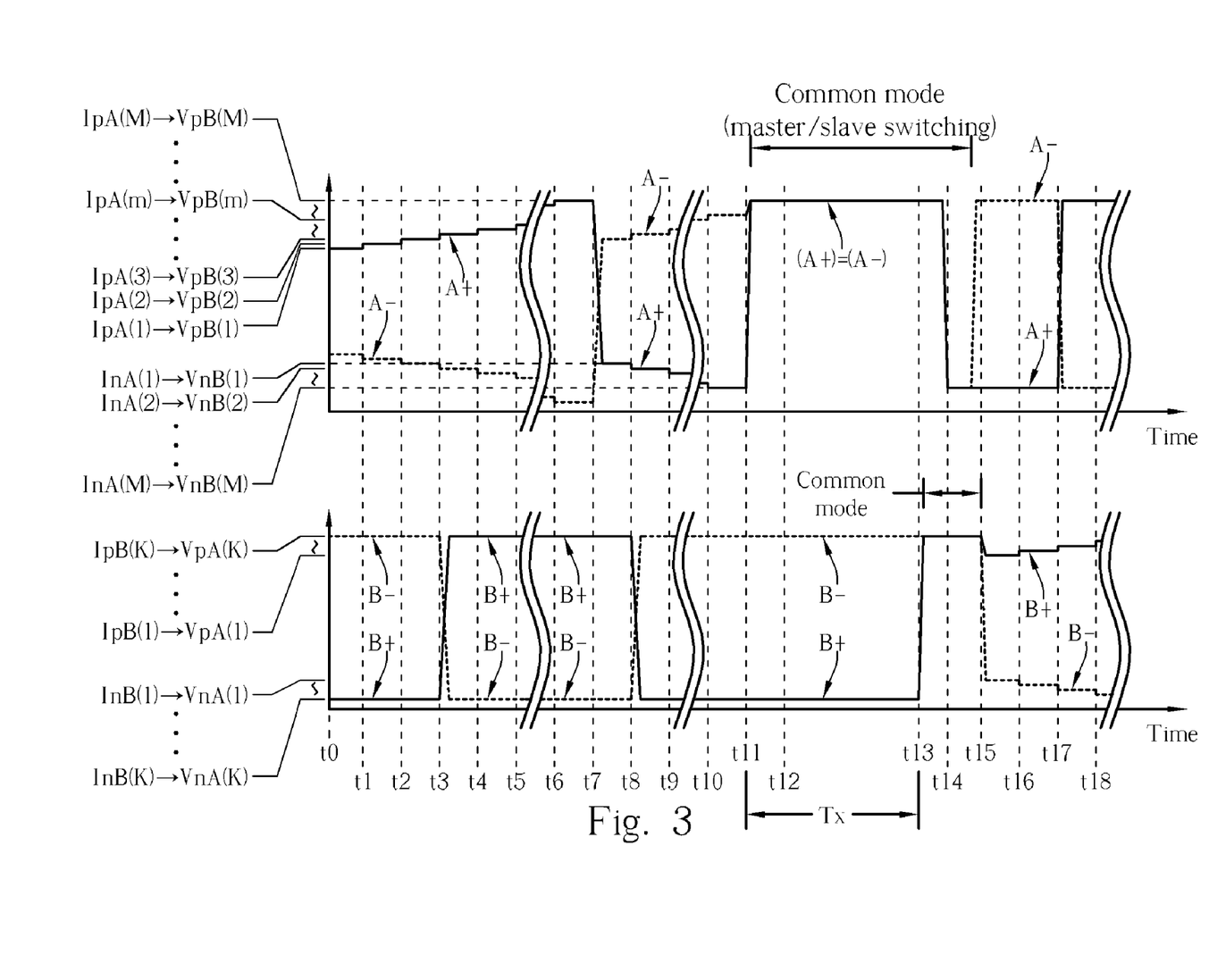
FIG. 3 is a timing diagram of each related signal when the electronic system shown in FIG. 2 performs the flowchart shown in FIG. 1.

In order to further illustrate the implementation of the flowchart 100, please refer to FIG. 2 and FIG. 3. FIG. 2 is a block diagram of an electronic system 10 according to the present invention. FIG. 3 is a timing diagram of each related signal when the electronic system 10 shown in FIG. 2 performs the flowchart 100 shown in FIG. 1. In FIG. 3, the horizontal axis represents the time, and the vertical axis represents the electronic (voltage or current) level of signals. First, as shown in FIG. 2, the electronic system 10 comprises two chips 12A and 12B connected to each other. When the flowchart 100 is performed, the two chips 12A and 12B can be respectively utilized as the above-mentioned chip A and chip B. In a macroscopic view, the chips 12A and 12B are substantially the same; the chip 12A, for example, comprises a core circuit 14A, an interface circuit 16A, and a driving circuit 18A, wherein the core circuit 14A is mainly utilized to control/implement the function of the chip 12A. For example, the core circuit 14A can be utilized to achieve the function of logic processing. The interface circuit 16A is the interface of the core circuit 12A for transferring/receiving signals from outside. The interface 16A can comprise a plurality of transferring circuits 24A (in FIG. 2 a differential amplifying circuit is utilized as an example of the transferring circuit) and receiving circuits 26A (in FIG. 2 a differential sensing circuit is utilized as an example of the receiving circuit). Therefore, signals to be transferred from the core circuit 12A are transferred through each transferring circuit 24A, and signals to be transferred from other chips into the core circuit 12A are read by the receiving circuit 26A in order to transform the signals into receivable electronic signals of the core circuit 12A. The positive driving force IpA and the negative driving force InA of each transferring circuit 24A are controlled by the driving circuit 18A, wherein the positive driving force IpA can pull up the electronic level of the signal receiving end of another chip, and the negative driving force InA can pull down the electronic level of the signal receiving end of another chip.

In order to implement the technique of the present invention, the chip 12A further comprises a testing circuit 20A and a comparing circuit 22A, wherein the testing circuit 20A is mainly utilized to control the flowchart 100 (for example, setting the test value of the test signal, selecting a driving force, and switching the master/slave relationships in step 118 at an appropriate time). When the chip 12A is utilized as the master chip, the comparing circuit 22A can compare the test signal and the value transferred back from the slave chip such that the testing circuit 20A can evaluate whether each driving force is acceptable. In another embodiment, if the comparing circuit 22A detects that the value transferred back from the slave chip does not comply with the test value, the driving circuit 18A is for providing a second driving force having a different driving force, and the interface circuit 16A is for generating a second test signal according to the second driving force in order to represent the test value.

Similar to the structure of the chip 12A, the chip 12B also comprises a core circuit 14B, an interface circuit 16B, and a driving circuit 18B. The interface circuit 16B comprises each receiving circuit 26B corresponding to each transferring circuit 24A of another chip, each transferring circuit 24B corresponding to each receiving circuit 26A of another chip, where a driving circuit 18B controls the positive driving force IpB and the negative driving force InB of each transferring circuit 24B. In order to implement the flowchart 100, the chip 12B also comprises a testing circuit 20B and a comparing circuit 22B.

When the present invention flowchart 100 is implemented in the chips 12A and 12B, a pair of signal transferring routes between the chips 12A and 12B can be selected, where one of the signal transferring routes is utilized to transfer signals to a certain chip, and the other signal transferring route is utilized to receive signals from the certain chip. As shown in FIG. 2, a signal pair A+/A− from the chip 12A to the chip 12B can form one of the signal transferring routes. A signal pair B+/B− forms another signal transferring route. In the embodiment shown in FIG. 2, because each transferring circuit/receiving circuit is a differential amplifying/sensing circuit, each signal transferring route comprises a signal pair.

FIG. 3 is a timing diagram of signals on each signal transferring route between the chips 12A and 12B (that is, the chip A and the chip B) when the flowchart 100 is implemented according to the present invention. The upper field of FIG. 3 shows the signal pair A+/A− (A− is labeled as a dotted line), and the bottom field of FIG. 3 shows the signal pair B+/B− (B− is labeled as a dotted line). The transferring circuit of the chip 12A can selectively utilize M positive driving forces IpA(1), IpA(2), ..., IpA(M) to output the signals A+/A− to the chip 12B. After these positive driving forces are transferred to the chip 12B, the electronic level of the signal receiving end can be correspondingly pulled up to VpB(1) to VpB(M). That is, the chip 12B receives the signal A+ (wherein the signal A+ is an inverse signal of the signal A−) of electronic levels VpB(1) to VpB(M). Please note that these electronic levels VpB(.) are influenced by the environments. In other words, the electronic levels VpB(.) cannot be well controlled by the chips 12A and 12B. Therefore, the present invention is utilized to test the influences of the electronic levels. Furthermore, the transferring circuit of the chip 12A can selectively utilize the negative driving forces InA(1), InA(2), ..., InA(M) to output signals A+/A− to the chip 12B in order to pull down the electronic level to the level VnB(1), VnB(2), ..., VnB(M). In other words, the chip 12B receives the signals A+ (signal A− is the inversed signal) having levels VnB(1) to VnB(M). These levels VnB(1) to VnB(M) are also influenced by the environment.

Similarly, in another signal transferring route, the chip 12B can utilize positive driving forces IpB(1) to IpB(K) to output signals B+/B− to the chip 12A such that the chip 12A receives the signals B+ (where the signal B− is the inversed signal) having electronic levels VpA(1) to VpA(K). Furthermore, the chip 12B can utilize negative driving forces InB(1) to InB(K) to drive the signals B+/B− such that the chip 12A receives signals B+ (where signals B− are inversed signals) having electronic levels VnA(1) to VnA(K). Each signal level VpA (1) to VpA(K), and VnA(1) to VnA(K) is influenced by the environment.

As shown in FIG. 3, at time t0, the chips 12A and 12B start to perform the flowchart 100. At first, the chip 12A is the master chip, and the chip 12B is the slave chip. Therefore, at time t0, the master chip 12A utilizes the positive driving force IpA(1) and the signals A+/A− to output a test signal having a digital value "1" (step 106). The driving force IpA(1) makes the slave chip 12B receive the signal A+ (and the inversed signal A−) having the electronic level VpB(1). The electronic level is not enough to make the slave chip 12B read it as the value "1" and the slave chip 12B reads it as the value "0". Therefore, between time t0 and time t1, the slave chip 12B utilizes the strongest negative driving force InB(K) to output a response signal B+ (and B−) to the master chip 12A in order to transfer back the value "0", which represents the value read by the slave chip 12B (step 108 and step 110.) After the master chip 12A receives the read value "0" from the signals B+/B− transferred from the slave chip 12B, the master chip 12A can know that the driving force is not enough to generate correct signals to be read (step 112.) At the time t1, the master chip 12A performs step 106 from the steps 114 and 116. This means that the master chip 12A utilizes another driving force IpA(2) to drive the signals A+/A− in order to output the test signal having the test value "1". The driving force IpA(2) can pull up the electronic level of the signal B+ of the slave chip 12B to the electronic level VpB(2). Assuming that this electronic level is still not enough for the chip 12B to read it as the value "1", the slave chip 12B utilizes the strongest negative driving force InB(K) to drive the signals B+/B− (step 108 and step 110) again in order to transfer back the value "0". After the value "0" is received by the chip 12A, and the value "0" is compared with the test value "1", the master chip 12A can know that the positive driving force IpA(2) is still not enough to generate a correct signal.

After evaluating the positive driving force IpA(2) between time t1 and time t2, the master chip 12A can utilize the positive driving force IpA(3) to output the test signal having the test value "1" at time t2. Furthermore, the driving force IpA(3) is evaluated by comparing the test value with the value transferred from the chip 12B. Through the steps 106, 108, 110, and 112 of the flowchart 100, the master chip 12 can orderly utilize each positive driving force IpA(1), IpA(2), . . . to output the test signal having the value "1" to the slave chip such that each positive driving force can be evaluated. At time t3, assume that a certain positive driving force selected by the master chip 12A can establish enough electronic level of the slave chip 12B to make the chip 12B read it as the value "1". The slave chip 12B changes to utilize the strongest positive driving force IpB(K) to drive the signals B+/B− in order to transfer a response signal having a value "1" to the master chip 12A. Therefore, the master chip 12A receives the response signal and knows that the driving force is an available (acceptable) driving force, which can be utilized to generate a correct signal.

At time t7, after the master chip 12A orderly evaluates all positive driving forces IpA(1) to IpA(M), the master chip 12A can orderly evaluate each negative driving force InA(1) to InA(M). At time t7, the master chip 12A changes to utilize the negative driving InA(1) to drive the signals A+/A− in order to output the test signal having the test value "0" to the slave chip 12B. The negative driving force can pull down the signal A+ to the electronic level VnB(1). Furthermore, if the electronic level VnB(1) is now low enough, the slave chip 12B determines it as the value "1" and utilizes the strongest positive driving force IpB(K) to drive the signal B+/B− in order to transfer the value "1" back to the chip 12A. Therefore, the chip 12A can evaluate that the driving force InA(1) cannot be utilized to output a correct signal according to the response signal. Similarly, at the time t8, the master chip 12A utilizes a next driving force InA(2) to drive the signals A+/A−. Assuming that the driving force can efficiently drive the signals B+/B− such that the slave chip 12B can determine it as the value "0", the slave chip 12B can utilize the strongest driving force InB(K) to drive the signals B+/B− in order to transfer the value "0" back to the chip 12A. Therefore, the master chip 12A can know that the negative driving force InA(2) can be utilized to generate a correct signal.

At time t11, the master chip 12A has evaluated all negative driving forces InA(1) to InA(M). The flowchart 100 can go from step 114 to step 118. That is, a specific signal exchanging protocol is utilized to inform the chip 12B such that the chips 12A and 12B can exchange their master/slave relationship. In the embodiments shown in FIG. 2 and FIG. 3, the present invention utilizes the characteristics of the signal pairs A+/A− and B+/B− to perform step 118. At first, the master chip 12A can make the transferring circuit of the signals A+/A− perform a common-mode operation in order to utilize the strongest driving force to drive the signals A+/A− to the value "1". The master chip 12A further makes this state last for a period of time (the period Tx). The above-mentioned signal state is utilized to inform the slave chip 12B to make the slave chip 12B prepare to start the step 118. At time t13, the slave chip 12B finds that the master chip 12A maintains the signal A+/A− as the common-mode value "1" until the predetermined time Tx is completed such that the slave chip 12B knows that step 118 has to be started. Therefore, at time t13, the slave chip 12B performs the common-mode operation on the transferring circuit of the signals B+/B− in order to utilize the strongest driving force to drive the signals B+/B− to the value "1". This represents that the chip 12B has recognized the requirement of the chip 12A and step 118 is prepared.

After the chip 12A receives the response of the chip 12B from the signals B+/B−, the chip 12A can utilize the strongest negative driving force to drive the signals A+/A− as the value "0". This represents that the chip 12A has been prepared to become the slave chip in order to test each driving force of the chip 12B. Furthermore, the chip 12A recovers the transferring circuit of the signals A+/A− back to the differential mode such that the chip 12A has become the slave chip in the flowchart 100 (step 104A'). On the other hand, after the chip 12A receives the common-mode value "0" from the signals A+/A−, the chip 12B recovers the transferring circuit of the signals B+/B− back to the differential mode such that the chip 12B becomes the master chip (step 104B'). At time t15, the master chip 12B can perform step 106' in order to utilize the positive driving force IpB(1) to drive the signal B+/B− to output a test signal having the value "1" to the slave chip 12A. The slave chip 12A can then read the value of the test signal and utilize the strongest positive driving force IpA(M) or negative driving force InA(M) to drive the signal A+/A− to output a response signal to the master chip 12B. Therefore, the read value of the chip A can be transferred back to the chip 12B such that the master chip 12B can evaluate whether the driving force IpB(1) can generate a correct signal. Similarly, when the master chip 12B orderly evaluates all the positive/negative driving forces IpB(.), InB(.), the flowchart 100 can go to the step 120 and the whole flowchart 100 is finished.

As mentioned previously regarding step 120 in the flowchart 100, when the two chips connected to each other evaluate the driving forces completely, each chip can know which driving forces are available. Moreover, when the flowchart 100 is completely performed and chips start to exchange data with each other, each chip selects one of the available driving forces to output signals to another chip. For example, following the examples shown in FIG. 2 and FIG. 3, assuming that the chip 12A detects that the positive driving forces IpA(m0), IpA(m0+1), IpA(m0+2), to IpA(M) (wherein m0 is a fixed value) are available after the above-mentioned testing operations, when the chip 12A outputs signals, the chip 12A can select the driving force IpA(m0+2) to output the signal having the value "1". That is, the positive driving force IpA(m0+2), which is stronger than the weakest available positive driving force IpA(m0), can be selected. Similarly, if the chip 12A detects that the negative driving forces InA(m1), InA(m1+1), InA(m1+2), to InA(M) are available (wherein m1 is a fixed value) the chip 12A can select the negative driving force InA(m1+2) to drive the signal to output the signal having the value "0". Therefore, it can ensure that the chip 12A can output signals having the value "0" and "1". Furthermore, when each chip finishes the flowchart 100 and can correctly start the operation of exchanging data, the chips still can select other available driving forces according to the test results. For example, when the chips 12A and 12B have to frequently exchange a large amount of data, the chip 12A can select a stronger driving force (such as IpA(m0+3)/InA(m1+3)) to drive the signals having the values "0" and "1". Please note that in normal operations, even though the chip can utilize the strongest driving force to ensure the data are always correctly read, the power consumption can be increased at the same time. This may raise the temperature of the chip and increase the noise (such as thermal noise). Therefore, the strongest driving force is not the best driving force for the chip to utilize. The present invention can detect the available driving forces and select an appropriate and efficient driving force according to the test result such that the present invention can obtain a better balance between "power consumption" and "signal/data accuracy".

In the electronic system 10 shown in FIG. 2, when the chips 12A and 12B complete the flowchart 100 and start to exchange data, signals A+/A− and B+/B− can be controlled by the core circuits of each chip such that these signal transferring routes can be utilized to transfer signals of the normal operation. At that time, the test circuit of each chip can stop operating. In other words, when the chips 12A and 12B are utilized to perform the flowchart 100, the chips 12A and 12B can utilize the signal transferring route to exchange wanted test signal/response signals and perform signal communication to switch the master/slave protocol. After the flowchart 100 is completely performed, these signal transferring routes can be utilized normally. These signal transferring routes can be utilized for a normal use of data exchange. Furthermore, in the embodiments shown in FIG. 2 and FIG. 3, the test signal/response signal, used to evaluate the driving forces, and the signal changing protocol (step 118) are implemented in the same signal transferring routes. This means that the signals A+/A− and B+/B− are utilized to implement the switching of the test signal and the response signal in the differential mode. Similarly, the signals A+/A− and B+/B− are also utilized to trigger the switching of the master/slave relationships in the common mode. The present invention can utilize different signal transferring routes to respectively implement the test signal/response signal and the signal switching protocol for switching the master/slave relationship. For example, the present invention chips 12A and 12B can further select two signal transferring routes C+/C− and D+/D− (not shown in FIG. 2), which are dedicated to implementing the signal exchange protocol of switching the master/slave relationships. Therefore, the original signal transferring routes A+/A− and B+/B− are only utilized to exchange the test signal and the response signal. In the above-mentioned embodiment, when the chips 12A and 12B needs to switch the master/slave relationships, the signal transferring routes C+/C− and D+/D− can be utilized to confirm such that the master/slave relationships can be switched.

When two connected chips of an electronic system exchange data/signals with each other, the chip receiving the data can compare the signal level with a reference value in order to determine the value of the signal. For example, in a digital electronic system, each chip can determine the content of the signal as the value "1" or "0" according to the comparison result. On the other hand, if the electronic level of the reference value is changed, the comparison results are also influenced because of the changed reference value. The present invention can be implemented in this electronic system such that each chip of the electronic system can evaluate the reference values. Therefore, the chip can know which reference value can be utilized to correctly determine the content of a received signal.

Figure 4:
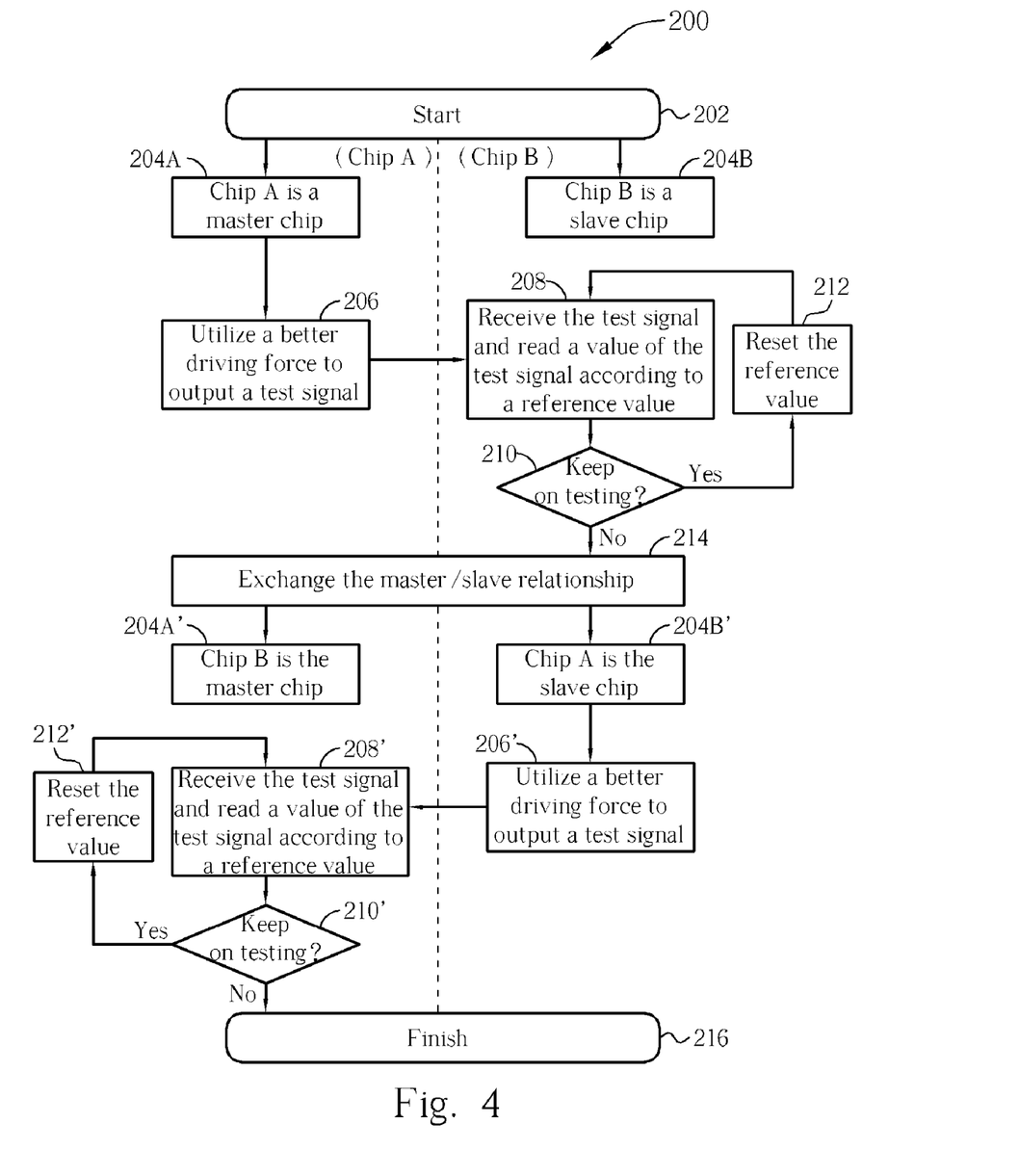
FIG. 4 is a flowchart of calibration technique of another embodiment according to the present invention.

Please refer to FIG. 4, which is a flowchart chart of a flowchart 200 of another embodiment of a calibration technique according to the present invention. The flowchart 200 can be implemented in the chips A and B of an electronic system such that the chips A and B can evaluate each reference value. The flowchart 200 comprises the following steps:

Step 202: Start the flowchart 200. The flowchart 200 is similar to the flowchart 100 shown in FIG. 1. The present invention can start the flowchart 200 before the normal operation of the chips and after the chips are powered.

Steps 204A and 204B: Set chip A as a master chip, and set chip B as a slave chip.

Step 206: The master chip can utilize a better driving force to output a test signal to the slave chip. The master chip can select a plurality of driving forces to output the test signal. After consideration of the power consumption and the driving ability of the driving forces, there should be a better driving force available. Please note that the better driving force does not have to be the strongest driving force. Furthermore, the master chip can utilize the aforementioned better driving force to output a test signal to the slave chip. When performing the step, the master chip can firstly utilize the strongest driving force to output a standard signal in order to inform a correct digital content of the test signal to the slave chip. The better driving force is utilized to output the test signal.

Step 208: The slave chip receives the test signal and determines the content according to a selected reference value. For example, if the electronic level of the test signal is larger than the reference value, the test signal is determined as the value "1". If the electronic level of the test signal is less than the reference value, the test signal is not determined as the value "1". After the slave chip determines the test signal, the read value can be compared with the original value in order to evaluate whether the reference value can be utilized to correctly read the test signal. For example, in step 206, the master chip can inform the slave chip by utilizing a standard signal in order to output a test signal having the value "1". The master chip can then utilize a better driving force to output the test signal. The slave chip receives the standard signal and knows that the test signal has the value "1". The slave chip may determine the test signal as the value "0", however, because the slave chip utilizes a selected reference value to determine the test value. This represents that the selected reference value is not an available reference value. If the slave chip utilizes the selected reference value to read the test signal, and if the read value is the same as the value of the standard signal, this represents that the reference value is available to the slave chip to correctly read the signal generated by the master chip. Therefore, the slave chip can evaluate the selected reference value as an available reference value.

Step 210: If the slave chip needs to evaluate another reference value (or evaluates the same reference value again), go to step 212; if the slave chip does not need to evaluate any reference values, go to step 214.

Step 212: The slave chip resets the reference value to perform the step 208 again.

Step 214: The master chip and the slave chip exchange the master/slave relationship through a predetermined signal exchange protocol.

Step 204A' and step 204B': After step 214 is completely performed, chip A becomes the slave chip, and chip B becomes the master chip.

Steps 206', 208', 210', and 212': These steps are the same as the respective steps 206, 208, 210, and 212.

Step 216: When chip A and chip B complete the evaluations of the reference values, the flowchart 200 finishes. Chip A and chip B can utilize better driving forces to output a signal and read the signal by utilizing an available reference value. Therefore, chip A and chip B can correctly exchange data/signals, co-ordinate with each other, and start to work. For example, if the flowchart 200 is implemented in the computer system, when the flowchart 200 is completely performed, each chip of the computer system can correctly coordinate with each other such that the BIOS can be loaded/executed correctly. The booting procedure is then completely performed.

In addition, in the above flowchart 200, the steps 206 and 208 (and steps 206' and 208') can be implemented in other ways. For example, the master chip can utilize a better driving force to output a test signal to the slave chip, and the slave chip can receive the test signal and read the test signal by using a selected reference value. The slave chip utilizes a strongest driving force to transfer the read value back to the master chip. After the master chip receives the read value, the master chip compares the read value with the original value to evaluate the reference value. The master chip can also transfer the comparison result back to the slave chip such that the slave chip can know whether the read value is correct. If the read value is correct, the slave chip can determine the selected reference value as an available value. On the other hand, if the read value is not correct, the slave chip can determine the selected reference value as an unavailable reference value. By repeating the above-mentioned flowchart, the slave chip can gradually evaluate all reference values, and the master chip does not need to send the standard signal of step 206.

In addition, each chip can have a plurality of different references to read the received signals. For example, a certain chip may have a high-level reference value and a low-level reference value. That is, if the electronic level of the received signal is larger than the high-level reference value, the received signal is determined as the value "1". If the electronic level of the received signal is less than the low-level reference value, the received signal is determined as the value "0". When the flowchart 200 is performed on this type of chip, the steps 206, 208, 210, and 212 can be first performed to evaluate the high-level reference values to determine available high-level reference values. The steps 206, 208, 210, and 212 can be performed again to determine available low-level reference values.

Figure 5:
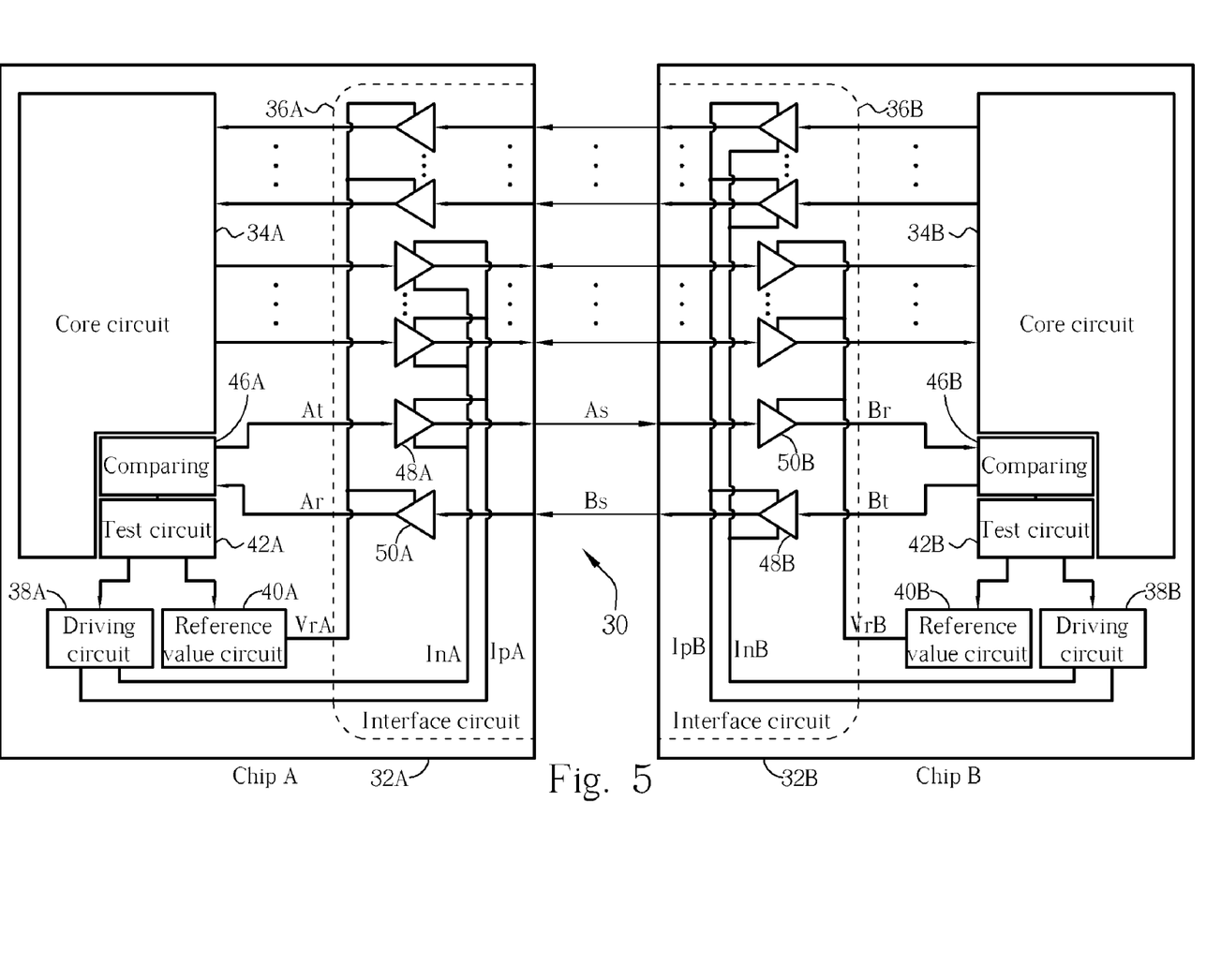
FIG. 5 is a block diagram of an electronic system according to the present invention.
Figure 6:
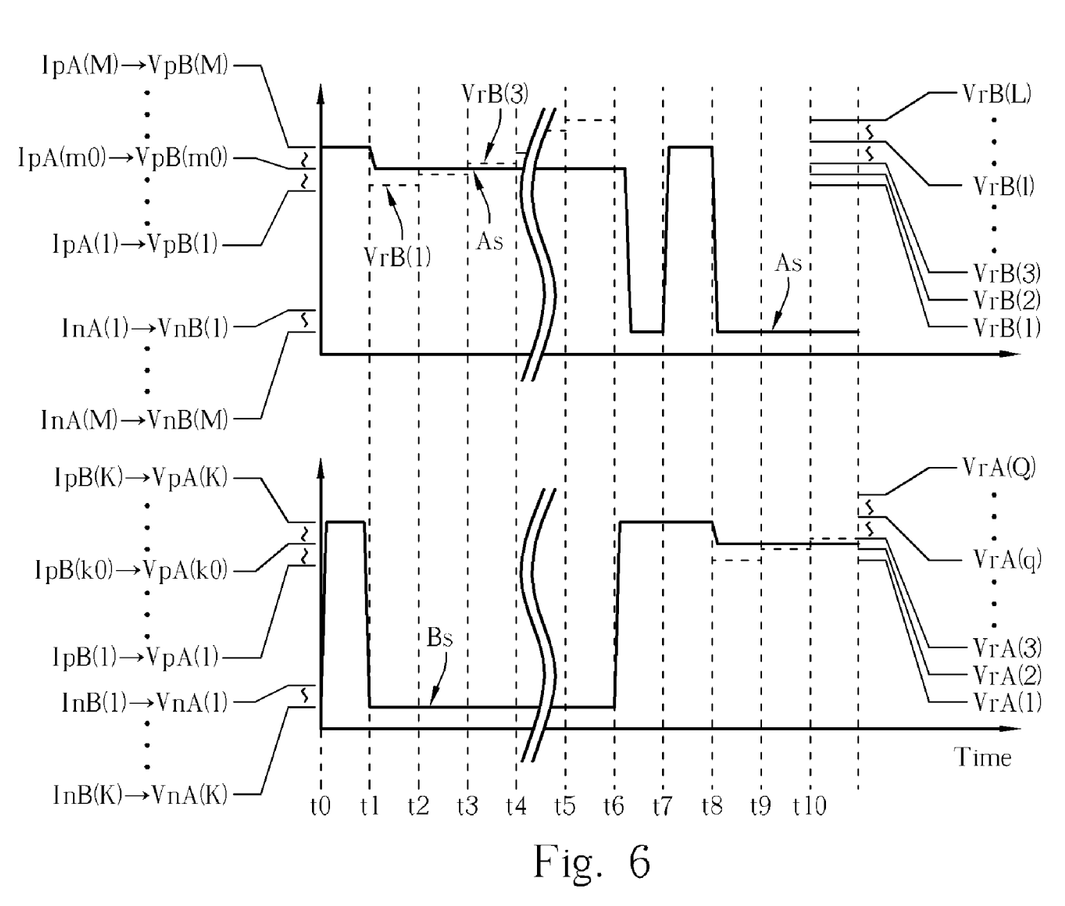
FIG. 6 is a timing diagram of each related signal when the electronic system shown in FIG. 5 performs the flowchart.

In order to further illustrate the implementation of the flowchart 200, please refer to FIG. 5 and FIG. 6 (in conjunction with FIG. 4). FIG. 5 is a block diagram of an electronic system 30. FIG. 6 is a timing diagram of each related signal when the electronic system 30 shown in FIG. 5 performs the flowchart 200. The horizontal axis of FIG. 6 is time, and the vertical axis of FIG. 6 is the electronic level (such as voltage or current) of the signal. As shown in FIG. 5, the electronic system 30 comprises two connected chips 32A and 32B, which can be regarded as chip A and chip B. The chips 32A and 32B are similar to the chips 12A and 12B shown in FIG. 2. The chips 32A and 32B comprise core circuits 34A and 34B and interface circuits 36A and 36B. The interface circuit 36A comprises a plurality of transferring circuits 48A for receiving signals and a plurality of receiving circuits 50A for receiving/sensing signals. Furthermore, the interface circuit 36B correspondingly comprises a plurality of receiving circuits 50B and transferring circuits 48B. The chip 32A comprises a driving circuit 38A to control the positive/negative driving forces IpA and InA of each transferring circuit. Each receiving circuit 50A reads the received signal according to a reference value VrA, which is controlled by the reference value circuit 40A. Similarly, in the chip 32B, the positive/negative driving forces IpB and InB of each transferring circuit 48B are controlled by the driving circuit 38B. The reference value circuit 40B is utilized to control the reference value of each transferring circuit 50B.

In order to implement the present invention in the electronic system 30, the chips 32A and 32B respectively comprise corresponding test circuits 42A and 42B and comparing circuits 46A and 46B. The test circuits 42A and 42B can manage the operation of the test flowchart 200, and the comparing circuits 46A and 46B can compare the original value of the test signal with the read value such that the test circuits 42A and 42B can evaluate whether a specific reference value is available. Furthermore, two signal transferring routes between the chips 32A and 32B are selected to respectively transfer the signals As and Bs. Therefore, the flowchart 200 can be implemented in the two chips.

Similar to FIG. 3, as shown in FIG. 6, the chip 32A can selectively utilize positive driving forces IpA(1) to IpA(M), or negative driving forces InA(1) to InA(M) to drive the signal As. The chip 32B can then receive the signal having the electronic level VpB(1) to VPB(M) and VnB(1) to VnB(M). Please note that these electronic levels are influenced by environmental factors. After receiving the signal As, the chip 32B can select different reference values VrB(1) to VrB(L) (that is, different reference levels) to read the signal. Similarly, the chip 32B can selectively utilize the positive driving forces IpB(1) to IpB(K) and InB(1) to InB(K) to drive the signal Bs such that the chip 32A can receive the signal Bs having the electronic levels VpA(1) to VPA(K) and VnA(1) to VnA(K). The chip 32A can then select the reference values VrA(1) to VrA(Q) to read the signal Bs.

In FIG. 6, the flowchart 200 can start at time t0, and the master chip (at this time, the master chip is the chip 32A) utilizes the strongest positive driving force IpA(M) to drive the signal As to output a standard signal to the slave chip (at this time, the slave chip is the chip 32B). This represents that the master chip 32A will output a test signal having the value "1" by using a better driving force. After the slave chip 32B receives the standard signal, the slave chip 32B can record the value "1" and utilize the strongest positive driving force IpB(K) to drive the signal Bs in order to transfer back the signal as the response signal. This represents that the slave chip 32B has received the standard signal. The slave chip 32B can then utilize the strongest negative driving force InB(K) to drive the signal Bs to have the value "0" at the time t1. This represents that the slave chip 32B is ready to receive the test signal. When the master chip 32A recognizes that the signal Bs corresponds to the value "0", the master chip 32A changes to utilize the better driving force (assuming the better driving force is IpA (m0), where m0 is a fixed value) to output the test signal having the value "1" to the slave chip 32B (that is, the step 206 is performed at the time t1). After the slave chip 32B receives the test signal As having the electronic level VpB (m0), the slave chip 32B can first utilize the reference value VrB(1) to read the value to the test signal As (that is, the step 208 is performed between time t1 and t2). Assuming that the reference value VrB(1) is less than the electronic level VpB (m0) such that the slave chip 32B can read the test signal as the value "1", the chip 32B can evaluate the reference value VrB(1) as an available reference value. Similarly, between time t2 and time t3, the slave chip 32B can select another reference value VrB(2) to evaluate whether the reference value VrB(2) is available (that is, from step 212 to step 208). Similarly, between the time t3-t4, the slave chip 32B utilizes the reference value VrB(3) to read the signal As, but because the reference value VrB(3) is too high, the slave chip will read the test signal As as the value "0". Because the value "0" is not the same as the original value "1", the slave chip 32B can evaluate the reference value VrB(3) as an unavailable reference value.

At time t6, the slave chip 32B evaluates all the reference values VrB(1) to VrB(L), and step 214 can be performed such that the chips 32A and 32B can switch the master/slave relationships. The chip 32B can first utilize the strongest negative driving force InB(K) to drive the signal Bs in order to output the signal having the value "1" to the chip 32A. This represents that the chip 32B has completed evaluating the reference values. After the chip 32A receives the value "1" of the signal Bs, the chip 32A can first utilize the strongest negative driving force InA(M) to output the signal As having the value "0". This represents that the chip 32A is ready to switch the master/slave relationship. At time t7, the chip 32A can utilize the strongest positive driving force IpA(M) to drive the signal As again in order to output the signal having the value "1" to the chip 32B. This represents that the chip 32A has permitted the relationship switching. Therefore, the chips 32B/32A become the new master/slave chips. The slave chip 32A is now ready to receive the standard signal and the test signal from the master chip 32B. Furthermore, the master chip 32B can first utilize the strongest driving force IpB(K) to drive the signal Bs to output a standard signal having the value "1" after the time t7. The slave chip 32A receives the standard signal having the value "1", and the slave chip 32A can know that the master chip 32B will transfer the test signal having the value "1". At time t8, the slave chip 32A can drive the signal As to output the value "0" to ask the master chip 32B to start outputting the test signal. After receiving the value "0", the master chip 32B can start to utilize a better driving force (assuming that the better driving force is IpB(k0), where k0 is a fixed value) to drive the signal Bs. That is, the master chip 32B outputs a test signal to the slave chip 32A. Therefore, the slave chip 32A can orderly evaluate all reference values VrA(1) to VrA(Q) according to the test signal. After the chips 32B and 32A evaluate their reference values, the flowchart 200 can be finished. Similar to the embodiments shown in FIG. 1 to FIG. 3, in the embodiments of FIG. 4 to FIG. 6, after the flowchart 200 is finished and when the chips 32A and 32B start to operate, the signal transferring routes As, Bs can be utilized as a normal use of exchanging data between the two chips 32A and 32B instead of the test use of transferring the test signals.

Figure 7:
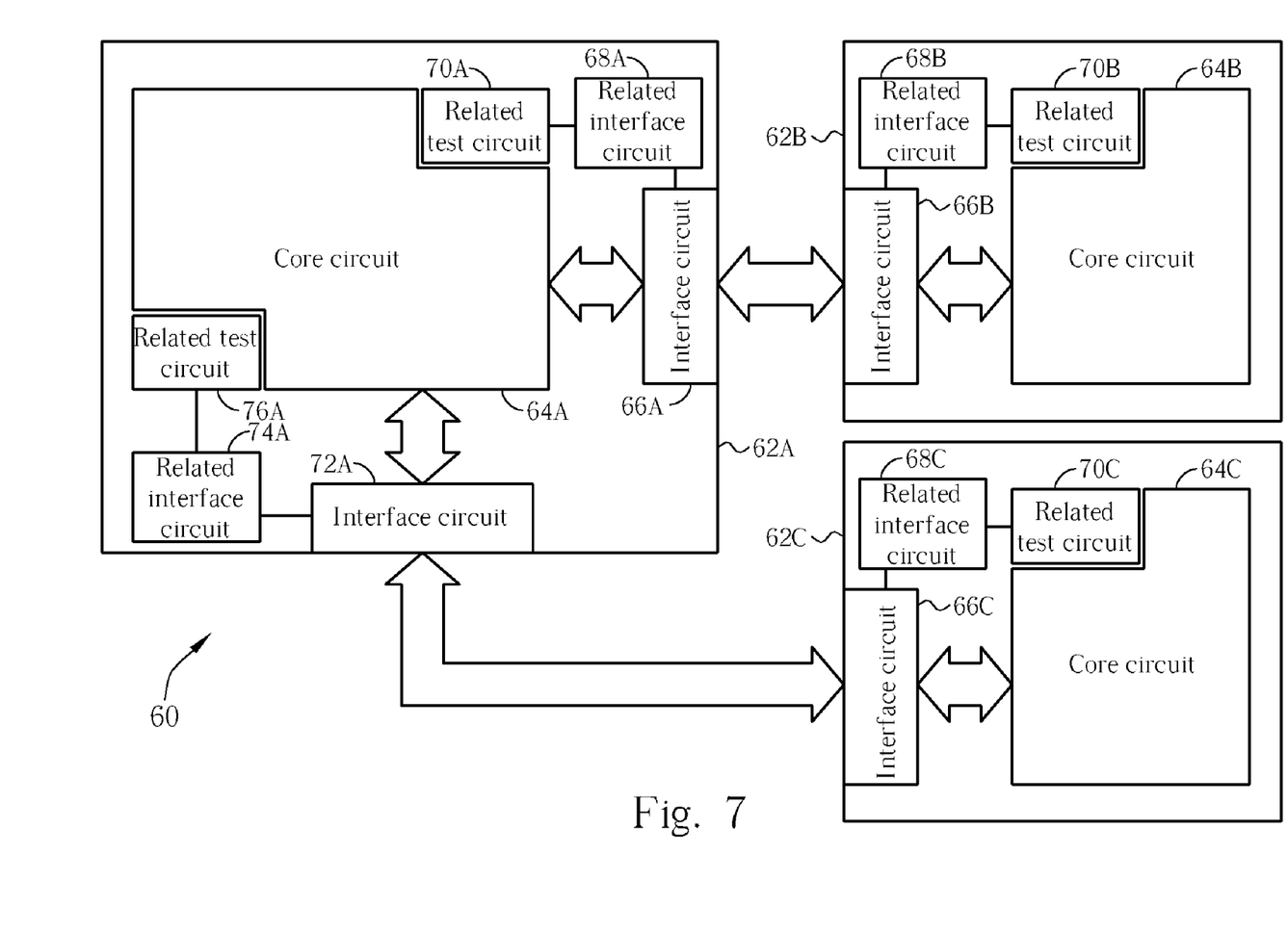
FIG. 7 is a block diagram of another electronic system according to the present invention.

In a more complicated electronic system (such as a computer system), a chip may be connected to a plurality of chips through a plurality of interface circuits. In this electronic system, the present invention can be implemented in pairs of interface circuits of the chips. Please refer to FIG. 7, which is a diagram of another electronic system 60 according to the present invention. As shown in FIG. 7, the electronic system 60 comprises multiple chips 62A, 62B, and 62C. Furthermore, each chip comprises its core circuit 64A to 64C. Because the chip 62A is connected to the chip 62B and the chip 62C, the chip 62A comprises two interface circuits 66A and 72A. The interface circuit 66A corresponds to the interface circuit 66B of the chip 62B such that the chips 62A and 62B can exchange data/signals. The interface circuit 72A corresponds to the interface circuit 66C of the chip 62C such that the chips 62A and 62C can exchange data/signals. In addition, each interface circuit 66A to 66C and 72A comprises corresponding related interface circuit 68A to 68C and 74A, where these related interface circuit can comprise driving circuits or reference value circuits such that the corresponding interface circuits can output signals or read signals according to the reference value. In order to implement the present invention in the electronic system 60, each interface circuit 66A-66C/72A can comprise corresponding related test circuits (including the comparing circuit and the test circuits) 70A-70C/76A. These related test circuits can manage the flowchart 100 or the flowchart 200 on the corresponding interface circuits. The related test circuits 70A and 70B can independently perform the flowcharts 100 and 200 between the interface circuits 66A and 66B. Similarly, the related test circuits 76A and 70C can independently perform the flowcharts 100 and 200 between the interface circuits 72A and 66C.

In fact, in the electronic systems shown in FIG. 2, FIG. 5, or FIG. 7, the related test circuit (including the test circuit and the comparing circuit) of each chip can be integrated in the corresponding core circuit. In other words, the test circuit/comparing circuit of each chip can be implemented by directly utilizing the logic function of the core circuit such that the present invention technique can be achieved.

To sum up, one of the primary objectives of the present invention is to utilize the tests between the chips to definitively evaluate related driving parameters (the driving forces/reference values) of transferring/receiving signals. Therefore, imperfect factors of the environment can be removed. In the prior art, when each chip starts to operate, each chip can only utilize the predetermined/embedded fixed driving force/reference value to exchange data. This means that the prior art chip cannot adjust itself according to the operational environment such that the chips may have some problems when exchanging data. This may cause the whole electronic system to fail to operate. In contrast to the prior art, the present invention first performs a test/evaluation and a calibration between the chips such that each chip can know which driving forces/reference values are available. After the chip starts to operate normally, the chip can be ensured to exchange data normally. Therefore, the electronic system can operate normally to achieve a predetermined function. In addition, the present invention is especially applicable to a portable electronic system such as a laptop or cell phone because these portable electronic systems often operate in different environments (for example, fluctuating temperature), and the compact volume often leads to a limitation of the operational environment (for example, the wire is hard to be optimized because of the compact volume). The present invention can make the electronic system dynamically operate with the operational environment, and have a balance between the "reading accuracy" and "power consumption". Therefore, the present invention has many advantages over the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for testing driving force parameters when a first chip and a second chip exchange signals, the method comprising:
   outputting a first test signal driven by a first driving force from the first chip, wherein the first test signal represents a first test value;
   receiving the first test signal at the second chip;
   determining by the second chip a first response value according to the first test signal;
   comparing by the first chip the first response value with the first test value to detect whether the first response value complies with the first test value; and
   outputting a second test signal driven by a second driving force from the first chip when the first response value does not comply with the first test value, wherein the second test signal represents the first test value and the second driving force is different from the first driving force.

2. The method of claim 1, further comprising:
   generating by the second chip a response signal to represent the response value determined by the second chip; and
   receiving the response signal at the first chip.

3. The method of claim 1 further comprising:
   receiving the second test signal by the second chip;
   determining by the second chip a second response value according to the second test signal; and
   comparing by the first chip the second response value with the test value to detect whether the second response value complies with the test value.

4. The method of claim 1 further comprising:
outputting a third test signal driven by a third driving force from the second chip, wherein the third test signal represents a second test value;
receiving the third test signal at the first chip;
determining by the first chip a second response value according to the third test signal; and
comparing by the second chip the second response value with the second test value to detect whether the second response value complies with the second test value.

5. The method of claim 1, wherein the second chip determines the first response value by detecting whether a power of the test signal is larger than a reference value, and the method further comprises:
utilizing another reference value to determine another value when the first response value does not comply with the first test value.

6. An electronic system comprising:
a first chip comprising:
    a first test circuit for providing a first test signal to represent a predetermined test value;
    a driving circuit for providing a first driving force; and
    a first interface circuit for generating the first test signal according to the first driving force;
a second chip comprising:
    a second interface circuit for receiving the first test signal and reading the first test signal to determine a response value; and
a comparing circuit for comparing the test value with the response value in order to detect whether the response value complies with the test value;
wherein when the comparing circuit detects that the response value does not comply with the test value, the driving circuit is for providing a second driving force, and the first interface circuit is for generating a second test signal according to the second driving force in order to represent the predetermined test value.

7. The electronic system of claim 6, wherein the second chip further comprises:
a second test circuit for providing a response signal representing the response value determined by the second interface circuit;
wherein the second interface circuit is for outputting the response signal to the first chip, and the comparing circuit is installed inside the first chip for comparing the response value represented by the response signal with the test value in order to detect whether the test value complies with the response value.

8. The electronic system of claim 6, wherein the driving circuit is for providing a plurality of different driving forces to make the first interface circuit provide a corresponding test signal according to each driving force in order to represent the test value.

9. A method of calibrating parameters related to signal communication between a first chip and a second chip, the method comprising:
performing a plurality of cross-tests between the first chip and the second chip, each cross-test being performed utilizing different settings of the signal communication parameters; wherein the cross-tests involve outputting a plurality of transmitted test values by the first chip to the second chip, and sending a plurality of received test values from the second chip to the first chip, the received test values corresponding to values of the transmitted test values as detected by the second chip;
comparing the received test values with the transmitted test values to thereby determine which of the settings of the signal communication parameters allow the second chip to correctly detect the transmitted test signals; and
calibrating the parameters related to signal communication by utilizing one of the settings of the signal communication parameters that allows the second chip to correctly detect the transmitted test signals.

10. The method of claim 9, wherein the signal communication parameters correspond to signal driving force, and the method further comprises outputting the transmitted test values by the first chip to the second chip utilizing a plurality of different driving forces.

11. The method of claim 10, further comprising:
always utilizing a strongest driving force when sending the received test values from the second chip to the first chip; and
comparing, by the first chip, the received test values received from the second chip with the transmitted test values to thereby determine which of the settings of the signal communication parameters allow the second chip to correctly detect the transmitted test signals.

12. The method of claim 10, wherein the transmitted test values outputted by the first chip all have a same value.

13. The method of claim 9, wherein the signal communication parameters correspond to a reference value utilized by the second chip when detecting the transmitted test values, and the method further comprises determining the received test values at the second chip by comparing a power of the transmitted test values as detected by the second chip with a plurality of different reference values.

14. The method of claim 13, further comprising:
outputting a standard value by the first chip to the second chip utilizing a strongest driving force in order to inform the second chip of a correct value of the transmitted test values, the standard value being equal to the correct value of the transmitted test values;
comparing, at the second chip, the received test values with the standard value to thereby determine which of the different reference values allow the second chip to correctly detect the transmitted test signals; and
calibrating the parameters related to signal communication by utilizing one of the reference values that allows the second chip to correctly detect the transmitted test signals.

15. The method of claim 9, further comprising, after calibrating the parameters related to signal communication in a direction from the first chip to the second chip, exchanging roles of the first chip and the second chip and calibrating the parameters for signal communication in a direction from the second chip to the first chip.

* * * * *